(12) United States Patent
Raghuraman et al.

(10) Patent No.: US 9,896,542 B2
(45) Date of Patent: Feb. 20, 2018

(54) DUAL CATALYST SYSTEM FOR HIGH PRIMARY HYDROXYL POLYOLS

(71) Applicant: Dow Global Technologies LLC, Midland, MI (US)

(72) Inventors: Arjun Raghuraman, Pearland, TX (US); Matthias Schaefer, Philippine (NL); Jean-Paul Masy, Destelbergen (BE); David S. Laitar, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/504,368

(22) PCT Filed: Oct. 19, 2015

(86) PCT No.: PCT/US2015/056143
§ 371 (c)(1),
(2) Date: Feb. 16, 2017

(87) PCT Pub. No.: WO2016/064698
PCT Pub. Date: Apr. 28, 2016

(65) Prior Publication Data
US 2017/0240702 A1    Aug. 24, 2017

Related U.S. Application Data

(60) Provisional application No. 62/067,072, filed on Oct. 22, 2014.

(51) Int. Cl.
*C08G 65/26*    (2006.01)

(52) U.S. Cl.
CPC ....... *C08G 65/269* (2013.01); *C08G 65/2654* (2013.01); *C08G 65/2663* (2013.01); *C08G 65/2696* (2013.01)

(58) Field of Classification Search
CPC .............. C08G 65/269; C08G 65/2663; C08G 65/2654; C08G 65/2696
See application file for complete search history.

(56) References Cited

U.S. PATENT DOCUMENTS

| | | |
|---|---|---|
| 4,687,755 A | 8/1987 | Green |
| 5,296,433 A | 3/1994 | Siedle et al. |
| 5,391,722 A | 2/1995 | Chandalia et al. |
| 5,468,839 A | 11/1995 | Suppes et al. |
| 5,763,642 A | 6/1998 | Cai |
| 6,028,230 A * | 2/2000 | Le-Khac ............ B01J 27/26 502/175 |
| 6,482,993 B1 | 11/2002 | Hofmann et al. |
| 6,531,566 B1 | 3/2003 | Satake |
| 7,005,552 B2 | 2/2006 | Kaushiva |
| 8,198,207 B2 | 6/2012 | Mohamed |
| 8,642,668 B2 | 2/2014 | Sasaki et al. |
| 2011/0105802 A1 | 5/2011 | Villa et al. |
| 2012/0016049 A1 | 1/2012 | Nakaminami et al. |
| 2012/0196999 A1 | 8/2012 | Nefzger et al. |
| 2014/0018459 A1 | 1/2014 | Shutov et al. |
| 2014/0142271 A1 | 5/2014 | Almena Munoz et al. |

FOREIGN PATENT DOCUMENTS

| | | |
|---|---|---|
| EP | 1528073 A1 | 5/2005 |
| NO | 9964493 A1 | 12/1999 |
| WO | 9964493 A1 | 12/1999 |
| WO | 0153381 A1 | 7/2001 |
| WO | 2012/091968 A1 | 7/2012 |
| WO | 2012/134849 A1 | 10/2012 |

OTHER PUBLICATIONS

Dalpozzo, R., et al; Erbium Triflate is a Highly Efficient Catalyst Synthesis 2009, pp. 3433-3438.
Williams, D.B., et al, Aluminium triflate 2005 Org Biomol Chem, V3, pp. 3269-3272.
International Search Report and Written Opinion for PCT/US2015/056143, dated Jan. 25, 2016. pp. 1-10.
International Preliminary Report on Patentability for PCT/US2015/056143, dated 2017, pp. 1-7.

* cited by examiner

*Primary Examiner* — Rosalynd A Keys

(57) ABSTRACT

A method of producing a high primary hydroxyl group content and a high number average molecular weight polyol includes preparing a mixture that includes a double metal cyanide catalyst and a low molecular weight polyether polyol having a number average molecular weight of less than 1,000 g/mol, the polyether polyol is derived from propylene oxide, ethylene oxide, or butylene oxide, setting the mixture to having a first temperature, adding at least one selected from propylene oxide, ethylene oxide, and butylene oxide to the mixture at the first temperature, allowing the mixture to react to form a reacted mixture, adding a Lewis acid catalyst to the reacted mixture, setting the reaction mixture including the second catalyst to have a second temperature that is less than the first temperature, and adding additional at least one selected from propylene oxide, ethylene oxide, and butylene oxide to the reacted mixture at the second temperature such that a resultant polyol having a primary hydroxyl group content of at least 60% and a number average molecular weight greater than 2,500 g/mol is formed.

14 Claims, 2 Drawing Sheets

DUAL CATALYST SYSTEM FOR HIGH PRIMARY HYDROXYL POLYOLS

FIELD

Embodiments relate to methods of manufacturing polyether polyols having a high primary hydroxyl content, using a dual catalyst system.

INTRODUCTION

Polyether polyols are produced by polymerizing an alkylene oxide in the presence of a starter compound and a catalyst. The starter compound has one or more functional groups the alkylene oxide can react with to begin forming polymer chains. The starter compound may influence the molecular weight and establish the number of hydroxyl groups that the resultant polyether polyol will have. With respect to the catalyst for forming polyether polyols, manufacturing is moving toward the use of a double-metal cyanide (DMC) catalyst in place of an alkali metal catalyst (such as a KOH based catalyst). However, as discussed in U.S. Pat. No. 6,482,993, a disadvantage of using DMC catalysts is the requirement of an induction period. Unlike alkali metal catalysts, DMC catalysts do not start polymerization immediately once the oxide and starter compound have been added. Accordingly, the use of a metal perfluoroalkylsulfonate catalyst prior to adding the DMC catalyst has been proposed. Further, the combined use of a superacid and a DMC catalyst (e.g., so to prepare short-chain polyfunctional polyether polyols having an improved and/or reduced cycle time as compared to conventional semi-batch base-catalyzed processes and/or to prepare short chain polyfunctional polyether polyols that do not require a finishing step in a semi-batch and/or continuously fed process) has been proposed, such as the method discussed in International Publication No. WO 2012/134849. This use of the additional catalyst first, may interfere with the DMC catalyst induced catalysis. Accordingly, a need exists for a dual catalyst system that allows for the DMC catalyst induced catalysis of the polymerization to occur without interference from other catalysts.

Further, a need exists for a dual catalyst polyol production method that allows for improved control with respect to obtaining a high primary hydroxyl group content polyether polyol (i.e., a primary hydroxyl group content greater than 60% based on the total number of hydroxyl groups). Also, a need exists for a dual catalyst system that can provide, in addition to a high primary hydroxyl group content, precise control of the polymerization reaction so as to obtain a high number average molecular weight (i.e., a Mn that is greater than 2500 g/mole) polyether polyol using a lower molecular weight starter compound (e.g., provided at high feed velocities so as to realize an overall improvement in reaction time).

SUMMARY

Embodiments may be realized by providing a method of producing a high primary hydroxyl group content and a high number average molecular weight polyol that includes preparing a mixture that includes a first catalyst and a low molecular weight polyether polyol having a number average molecular weight of less than 1,000 g/mol, the polyether polyol being derived from propylene oxide, ethylene oxide, or butylene oxide, and the first catalyst being a double metal cyanide catalyst; setting the mixture to having a first temperature, adding at least one selected from propylene oxide, ethylene oxide, and butylene oxide to the mixture at the first temperature, and allowing the mixture to react to form a reacted mixture; adding a second catalyst to the reacted mixture, the second being a Lewis acid catalyst having the general formula $M(R^1)_1(R^2)_1(R^3)_1(R4)_{0 \text{ or } 1}$, whereas M is boron, aluminum, indium, bismuth or erbium, R1 and R2 each independently includes a fluoro-substituted phenyl or methyl group, R3 includes a fluoro-substituted phenyl or methyl group or a functional group or functional polymer group, optional R4 is a functional group or functional polymer group; and setting the reaction mixture including the second catalyst to have a second temperature that is less than the first temperature and adding additional at least one selected from propylene oxide, ethylene oxide, and butylene oxide to the reacted mixture at the second temperature such that a resultant polyol having a primary hydroxyl group content of at least 60% and a number average molecular weight greater than 2,500 g/mol is formed.

DETAILED DESCRIPTION

Figure 1:
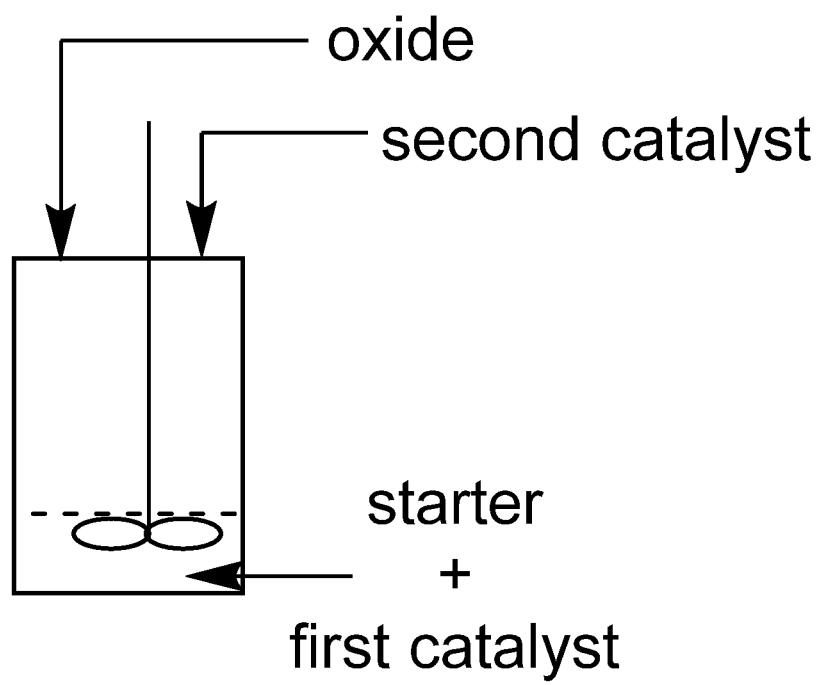
FIG. 1 illustrates an exemplary semi-batch process schematic for preparing a polyol according to embodiments.

Double-metal cyanide (DMC) catalysts are regarded as highly active alkoxylation catalysts that can be used at very low concentrations (e.g., less than 50 ppm based on the total weight of the composition used to form the propoxylated polyether polyol) to achieve rapid alkoxylation of oxides such as propylene oxide, ethylene oxide, and butylene oxide. For example, as shown in Example 1 of U.S. Pat. No. 6,531,566, used of a sodium hydroxide based alkali metal catalyst leads to a reaction time of twelve hours. However, a twelve hours reaction time may be regarded as unfavorable in a manufacturing setting, and the overall reaction time can be reduced by the use of a DMC catalyst. As discussed in International Publication No. WO 2012/091968, certain Lewis acids that essentially require no activation time have been evaluated as polymerization catalysts. However, the Lewis acids may become deactivated rapidly and may not be capable of producing high molecular weight polymers or of obtaining high conversions of alkylene oxides to polymer. Acid based catalysts, such as sodium hydroxide and Lewis acids, have a further disadvantage in that treatment such as filtration and/or acid finishing/neutralization (e.g., as discussed in U.S. Pat. No. 5,468,839) may be required to reduce the acid content of the resultant product. However, the use of DMC catalyst and/or a sufficiently low amount of acid based catalysts (such as Lewis acids) may eliminate the need for such treatment. In exemplary embodiments, the dual catalyst system for forming a polyether polyol (such as a propylene oxide based polyol) uses both a DMC catalyst and a boron based Lewis acid catalyst in a low amount such that filtration and acid finishing/neutralization are not required for the resultant polyether polyol.

Typical conditions under which DMC-catalyzed propoxylations are carried out using an alkylene oxide (e.g., using propylene oxide and excluding the use of any ethylene oxide and butylene oxide) may result in polyols with a high degree of secondary hydroxyl groups (e.g., greater than 90%). This result is characteristic of the use of DMC catalysts. Further, as discussed in International Publication No. WO 2012/09196, poly(propylene oxide) polymers produced by Lewis acid catalysis tend to have approximately 50% secondary hydroxyls and 50% primary hydroxyls. However, a higher primary hydroxyl group content (i.e., of at least 60%) is sought. By primary hydroxyl group it is meant a terminally located hydroxyl-containing group (e.g., on a polyoxyalkylene polyol such as a polyoxypropylene polyol) and by secondary hydroxyl group it is meant a non-terminally located hydroxyl containing group (e.g., on the polyoxyalkylene polyol such as a polyoxypropylene polyol).

Embodiments, relate to forming a polyether polyol (e.g., a propylene oxide based polyol) using a dual catalyst system that combines the benefits of using the highly active DMC catalyst with obtaining a high primary hydroxyl group content (i.e., greater than 60%) and a relatively high number average molecular weight (i.e., greater than 2,500 g/mol such as from 2,600 g/mol to 12,000 g/mol, 3,000 g/mol to 6,000 g/mol, etc.).

The dual catalyst system utilizes a DMC catalyst and a Lewis acid catalyst, e.g., in the following manner:

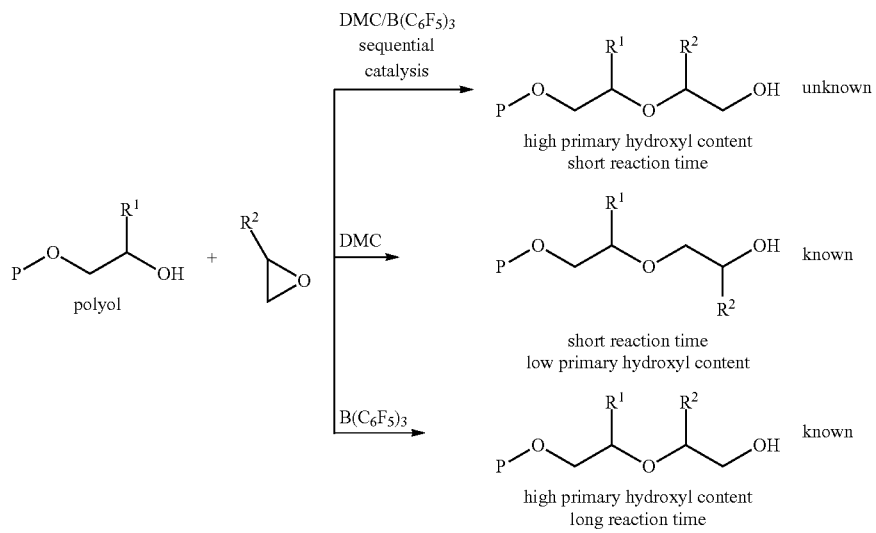

The method of using the dual catalyst system includes initially adding a DMC catalyst and later adding the Lewis acid catalyst that is separately provided and allowed to react at a lower temperature than the temperature at which the DMC catalyst was added.

DMC Catalyst

Exemplary double metal cyanide catalysts are discussed in, e.g., International Publication No. WO 2012/09196. The DMC catalyst, e.g., ones that are known in the art, may be used in the dual catalyst system. In particular, the DMC catalyst is the first catalyst that is provided as part of dual catalyst system in which at least a first catalyst and second catalyst after the first catalyst is provided.

For example, the DMC catalysts may be represented by the Formula 1:

$$M_b[M^1(CN)_r(X)_t]_c[M^2(X)_6]_d \cdot nM^3{}_xA_y \qquad \text{(Formula 1)}$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3{}_xA_y$, and n is zero or a positive integer. The foregoing formula does not reflect the presence of neutral complexing agents such as t-butanol which are often present in the DMC catalyst complex. M and $M^3$ are each a metal ion independently selected from the group of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$, with $Zn^{+2}$ being preferred. $M^1$ and $M^2$ are each independently selected from the group of $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$, $V^{+5}$, $Ni^{2+}$, $Pd^{2+}$, and $Pt^{2+}$. According to exemplary embodiments, those in the plus-three oxidation state are more used as the $M^1$ and $M^2$ metal. For example, $Co^{+3}$ and/or $Fe^{+3}$ may be used.

Exemplary anions A include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. For example, the chloride ion may be used. r is 4, 5 or 6 (e.g., 4 or 6, or 6); t is 0 or 1. In exemplary embodiments, r+t will equal six.

In exemplary embodiments, the DMC catalyst is a zinc hexacyanocobaltate catalyst complex. The DMC catalyst may be complexed with t-butanol. The DMC catalyst used in exemplary embodiments may be a blend catalyst that includes of one or more DMC catalysts. The blend catalyst may optionally include a non-DMC catalyst, in which the DMC catalysts account for at least 75 wt % of the total weight of the blend catalyst. The blend catalyst may exclude any of Lewis acid catalyst that is added at a later time in the dual catalyst system.

Lewis Acid Catalyst

The metal based Lewis acid catalyst has the general formula $M(R^1)_1(R^2)_1(R^3)_1(R^4)_{0\ or\ 1}$, whereas M is boron, aluminum, indium, bismuth or erbium, $R^1$ and $R^2$ each independently includes a fluoro-substituted phenyl or methyl group, $R^3$ includes a fluoro-substituted phenyl or methyl group or a functional group or functional polymer group, optional $R^4$ is a functional group or functional polymer group. By fluoro-substituted phenyl group it is meant a phenyl group that includes at least one hydrogen atom replaced with a fluorine atom. By fluoro-substituted methyl group it is meant a methyl group that includes at least one hydrogen atom replaced with a fluorine atom. $R^1$, $R^2$, and $R^3$ may include the fluoro-substituted phenyl group or may consist essentially of the fluoro-substituted phenyl group. $R^1$, $R^2$, and $R^3$ may include the fluoro-substituted methyl group, e.g., in the form of a fluoro-substituted methyl group bonded with a sulfuroxide (e.g., sulfurtrioxide). The M in the general formula may exist as a metal salt ion or as an integrally bonded part of the formula.

The functional group or functional polymer group may be a Lewis base that forms a complex with the Lewis acid catalyst (e.g., a boron based Lewis acid catalyst or a metal triflate catalyst). By functional group or functional polymer group it is meant a molecule that contains at least one of the following: an alcohol, an alkylaryl, a linear or branched alkyl having 1-12 carbon atoms, a cycloalkyl, a propyl, a propyl oxide, a mercaptan, an organosilane, an organosiloxane, an oxime, an alkylene group capable of functioning as a covalent bridge to another boron atom, a divalent organosiloxane group capable of functioning as a covalent bridge to another boron atom, and substituted analogs thereof. For example, the functional group or functional polymer group may have the formula (OYH)n, whereas O is O oxygen, H is hydrogen, and Y is H or an alkyl group. However, other known functional polymer groups combinable with a Lewis acid catalyst such as a boron based Lewis acid catalyst or metal triflate may be used.

According to exemplary embodiments, the Lewis acid catalyst is a boron based Lewis acid catalyst that has the general formula $B(R^1)_1(R^2)_1(R^3)_1(R^4)_{0 \text{ or } 1}$, whereas $R^1$ and $R^2$ are each independently the fluoro-substituted phenyl group, $R^3$ is the fluoro-substituted phenyl group or the functional group or functional polymer group, optionally $R^4$ is the functional group or functional polymer group.

In exemplary embodiments, the boron-based Lewis acid is tris(pentafluorophenyl)borane.

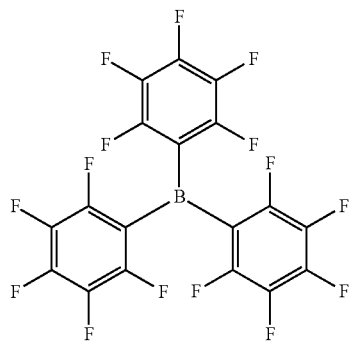 [SMILES: Fc1c(F)c(F)c(B(c2c(F)c(F)c(F)c(F)c2F)c2c(F)c(F)c(F)c(F)c2F)c(F)c1F]

An exemplary tris(pentafluorophenyl)borane complex has the following structure, whereas $^i$PrO is isopropoxy.

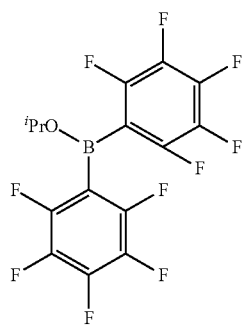 [SMILES: CC(C)OB(c1c(F)c(F)c(F)c(F)c1F)c1c(F)c(F)c(F)c(F)c1F]

The Lewis acid catalyst may be a metal triflate. For example, the metal triflate has the general formula $M(R^1)_1(R^2)_1(R^3)_1(R^4)_{0 \text{ or } 1}$, whereas M is aluminum, indium, bismuth or erbium, and $R^1$, $R^2$, and $R^3$ are each $CF_3SO_3$. The Lewis acid catalyst may be active at a lower temperature range (e.g., from 60° C.-110° C.). Exemplary references include U.S. Pat. No. 4,687,755; Williams, D. B. G.; Lawton, M. Aluminium triflate: a remarkable Lewis acid catalyst for the ring opening of epoxides by alcohols. *Org. Biomol. Chem.* 2005, 3, 3269-3272; Khodaei, M. M.; Khosropour, A. R.; Ghozati, K. *Tetrahedron Lett.* 2004, 45, 3525-3529; Dalpozzo, R.; Nardi, M.; Oliverio, M.; Paonessa, R.; Procopio, A. Erbium(III) triflate is a highly efficient catalyst for the synthesis of β-alkoxy alcohols, 1,2-diols and β-hydroxy sulfides by ring opening of epoxides. *Synthesis* 2009, 3433-3438.

The Lewis acid catalyst used in exemplary embodiments may be a blend catalyst that includes one or more Lewis acid catalyst (e.g., each having the general formula $B(R^1)_1(R^2)_1(R^3)_1(R^4)_{0 \text{ or } 1}$, whereas $R^1$ and $R^2$ are each independently a fluoro-substituted phenyl or methyl group, $R^3$ is a fluoro-substituted phenyl or methyl group or a functional group or functional polymer group, optional $R^4$ is the functional group or functional polymer group). The blend catalyst may optional include other catalysts, in which Lewis acid catalysts having the general formula account for at least 75 wt % of the total weight of the blend catalyst. The added blend catalyst may exclude any DMC based catalysts. Exemplary other metal based Lewis acids that are active at lower temperatures may be included as part of the dual catalyst system and/or the blend catalyst. Exemplary metal-based Lewis acids are based on one of aluminum, boron, copper, iron, silicon, tin, titanium, zinc, and zirconium.

Use of Dual Catalyst System

In embodiments, the alkoxylation of low hydroxyl equivalent weight starter compounds (such as an all propylene oxide polyol having an number average molecular weight of less than 1000 g/mol) cannot proceed directly from the starter compound to a finished polyether polyol. For example, because of the high concentration of hydroxyl groups and the starter compound during early stages of the polymerization severely inhibits initial catalyst activation, which may result in failure of catalyst induction or in premature deactivation of the catalyst early in the alkoxylation process. The reducing of the occurrence of such involves activation of the catalyst at a first temperature and by slowly adding at least one of propylene oxide, ethylene oxide, and butylene oxide to a mixture including the start compound and the DMC catalyst over a period of 30 minutes or less. Then, the reaction with the DMC catalyst is allowed to proceed (e.g., for less than 30 minutes). This allows an alkoxylated intermediate to be produced using the DMC catalyst (e.g., and without using any metal based Lewis acid so that only the DMC catalyst is used to form the alkoxylated intermediate). Then, the remainder of the polymerization (e.g., for less than forty-five minutes) is performed using the intermediate in the presence of the Lewis acid catalyst with activation at a second temperature that is different from the first temperature and by the additionally adding of at least one of propylene oxide, ethylene oxide, and butylene oxide to the reaction mixture.

The starter compound itself is formed using an alkylene oxide such as propylene oxide, ethylene oxide, or butylene oxide. The starter compound may be a diol or triol. For example, the starter compound is an all propylene oxide based diol or triol having an hydroxyl functional based equivalent weight of less than 500 g/mol equivalence. Further, a hydroxyl-containing initiator compound is used with the alkylene oxide to form the starter compound. The hydroxyl-containing initiator compound is any organic compound that is to be alkoxylated in the polymerization reaction. It contains 1 or more hydroxyl groups. It may contain as many as 12 or more hydroxyl groups. Mixtures of initiator compounds can be used. The initiator compound will have a hydroxyl equivalent weight less than that of the polyether product, e.g., may have a hydroxyl equivalent weight of from 30 to 500. Exemplary, initiator compounds include but are not limited to ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol and sucrose, as well as alkoxylates (especially ethoxylates and/or propoxylates) of any of these that have a hydroxyl equivalent weight less than that of the product of the polymerization (e.g., up to 500 g/mol equivalence).

When the Lewis acid catalyst is added to reaction mixture already having undergone an alkoxylation process in the presence of the DMC catalyst, the temperature of the reactor may be reduced at least 20° C. as compared to when the DMC catalyst was added. According to an exemplary embodiment, the first temperature of the reactor (in a batch or continuous process) may be at from 125° C. to 160° C. when the DMC catalyst is activated (e.g., during a time at which a propylene oxide feed is gradually/slowly added to the reactor and after the time at which the starter compound is mixed with the DMC catalyst). The temperature of the reactor may initially be reduced during the time at which the formation of the intermediate is allowed to proceed, without the addition of any alkylene oxide feed and before the addition of the Lewis acid. The reactor temperature may be at the second temperature of from 25° C. to 115° C. and/or from 60° C. to 115° C. when the Lewis acid is introduced. In exemplary embodiments, the control of the relative contribution of a mixture containing an active DMC catalyst and an active Lewis acid may enable the Lewis acid to dominate the addition of oxirane onto chain ends.

In an exemplary embodiment, when the polyether polyol is derived from propylene oxide based starter compound (e.g., a polyoxypropylene starter compound), at the first temperature propylene oxide is added to the mixture and at the second temperature propylene oxide, ethylene oxide, or butylene oxide is added to the reaction mixture.

The polyether polyol may be prepared in a two-step, one-pot process that uses a DMC catalyst and tris(pentafluorophenyl)borane in such a way that the polyol chain may be rapidly built using the DMC catalyst, and primary hydroxyl groups can be generated at chain ends by the later stage addition of tris(pentafluorophenyl)borane.

Figure 2:
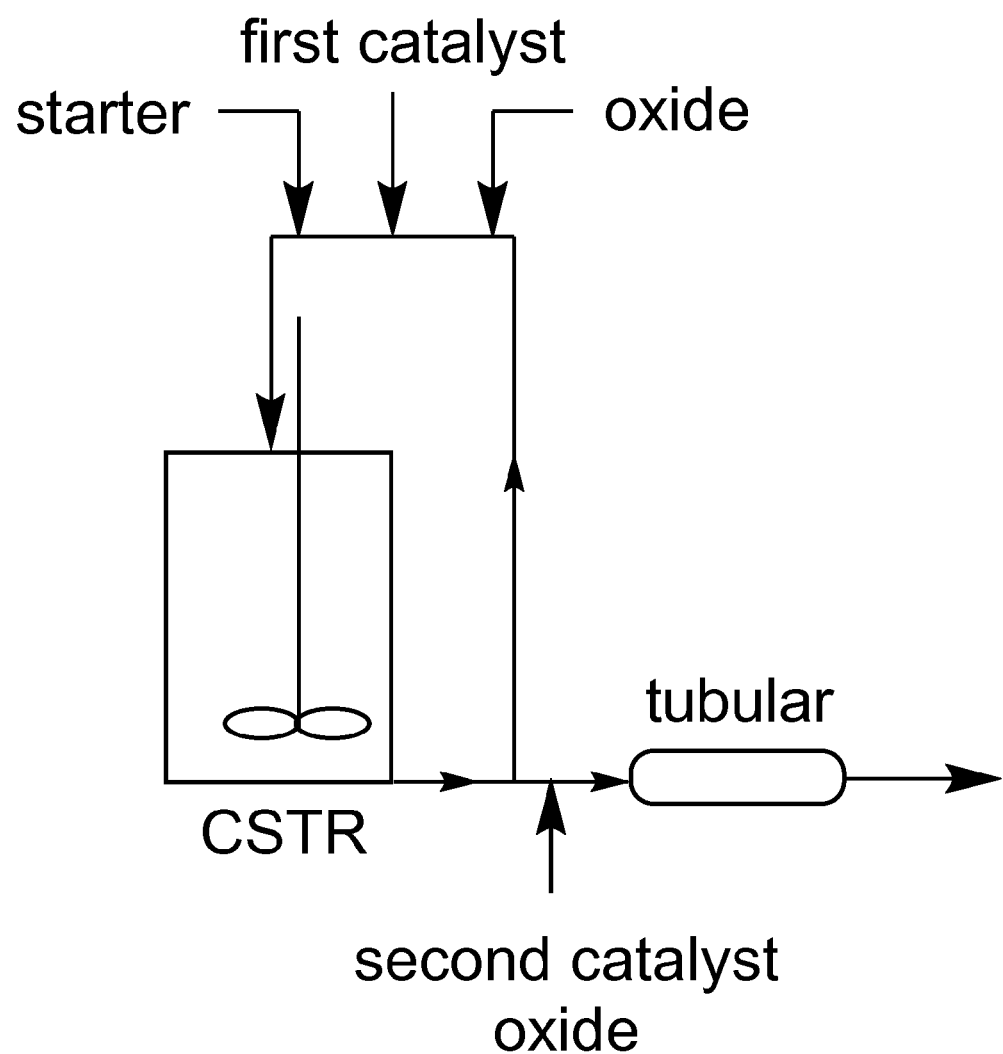
FIG. 2 illustrates an exemplary continuous process schematic for preparing a polyol according to embodiments.

The polymerization reaction can be performed in any type of vessel that is suitable for the pressures and temperatures encountered. An exemplary semi-batch process in shown in FIG. 1. An exemplary continuous process is shown in FIG. 2. In a continuous or semi-continuous process the vessel may have one or more inlets through which the alkylene oxide and additional initiator compound may be introduced during the reaction. In a continuous process, the reactor vessel should contain at least one outlet through which a portion of the partially polymerized reaction mixture may be withdrawn. A tubular reactor that has single or multiple points for injecting the starting materials, a loop reactor, and a continuous stirred tank reactor (CSTR) are all suitable types of vessels for continuous or semi-continuous operations. An exemplary process is discussed in U.S. Patent Publication No. 2011/0105802.

The resultant polyether polyol product obtained in any of the foregoing dual catalyst system based process may be further treated, e.g., in a flashing process and/or stripping process. For example, the polyether polyol may be treated to reduce catalyst residues even though the catalyst residue may be retained in the product. Moisture may be removed by stripping the polyol. The polyoxypropylene polyol, according to embodiments, may have a DMC concentration (in ppm in the final polyoxypropylene polyol) of from 15 ppm to 100 ppm (e.g., 35 ppm to 100 ppm, 50 ppm to 75 ppm, etc.). The polyoxypropylene polyol, according to embodiments, may have a Lewis acid catalyst concentration (in ppm in the final polyoxypropylene polyol) of from 100-500 ppm (e.g., 100 ppm to 250 ppm).

The polymerization reaction can be characterized by the "build ratio", which is defined as the ratio of the number average molecular weight of the polyether product to that of the initiator compound. This build ratio may be as high as 160, but is more commonly in the range of from 2.5 to about 65 and still more commonly in the range of from 2.5 to about 50. The build ratio is typically in the range of from about 2.5 to about 15, or from about 7 to about 11 when the polyether product has a hydroxyl equivalent weight of from 85 to 400.

Embodiments relate to a catalytic method for high primary hydroxyl content (e.g., at least 60% and/or approximately 70%) and high molecular weight polyols (e.g., polypropylene oxide polyols). In an exemplary embodiment, the one-pot method involves the use of the DMC catalyst and tris(pentafluorophenyl)borane (FAB) in a sequential manner. In particular, by performing the DMC catalyzed reaction and the FAB catalyzed reaction at temperatures greater than 130° C. and less than 110° C., respectively, the FAB catalyst may be utilized for regioselectivity the formation of primary hydroxyl groups in the presence of DMC catalyst. This method can be used to rapidly synthesize high molecular weight products from low molecular weight initiators.

Polyether polyols produced in accordance with the dual catalyst system process may be useful for making polyurethanes. Higher equivalent weight polyether polyol products may be useful in making elastomeric or semi-elastomeric polyurethane products, including noncellular or microcellular elastomers, coatings, adhesives, sealants, and flexible, rigid, and viscoelastic polyurethane foams. The flexible polyurethane foams may be made in a slabstock or molding process.

All parts and percentages are by weight unless otherwise indicated.

Examples

Analytical Methods:
Gel Permeation Chromatography (GPC):
GPC analysis for determination of number average molecular weight is carried out at a flow rate of 1.0 mL/min using four PLgel organic GPC columns connected in series (3 μm, Agilent Inc.) and tetrahydrofuran as eluent. The column temperature is 40° C. VORANOL™ CP 6001, VORANOL™ 210, 230-660, and 230-056N are used as internal standards.

Determination of Primary Hydroxyl and Secondary Hydroxyl Groups (Selectivity):

Selectivity of ring opening is determined by trifluoroacetylation followed by $^{19}$F-NMR analysis. Sample preparation is carried out using the procedure described in ASTM D 4273-94 and the SOP for sample preparation for $^{19}$F-NMR for polyether polyols available in Freeport analytical sciences-Mol structure database. As stated in the ASTM method, derivatization requires knowledge of OH# or the MW and functionality of the polyol as it decides the amount of TFAA used for derivatization of the polyol. It is necessary to add sufficient amount of TFAA to ensure completion of derivatization reaction.

OH# can be calculated as =33×% OH

% OH=1700/hydroxyl equivalent weight of the polyol

Hydroxyl equivalent weight of the polyol=MW of the polyol/functionality The ASTM method gives the following suggestion for amount of TFAA to be added to the reaction based on hydroxyl number.

| hydroxyl number | volume of TFAA |
|---|---|
| 24 to 75 | 1 ml |
| 76 to 150 | 2 ml |
| 151 to 225 | 3 ml |
| 226 to 300 | 4 ml |

$^{19}$F NMR Analyses:

$^{19}$F NMR spectra is acquired using a Bruker Avance III 400 MHz spectrometer. The data is acquired using 64 transient scans per data file, a 3 second pulse repetition delay, spectral width of 93,750 Hz, and a file size of 13K data points. The relaxation delay is verified to be adequate using a saturation recovery experiment. Spectra is acquired using trifluro-toluene as an internal chemical shift standard at 0.1 wt % in CDCl3.

The following materials are principally used:

Starter Compound 1 A polyoxypropylene triol having a number average molecular weight of approximately 700 g/mol, i.e., a low molecular weight PO triol (available from The Dow Chemical Company as VORANOL™ 270).

Starter Compound 2 A polyoxypropylene triol having a number average molecular weight of approximately 450 g/mol (available from The Dow Chemical Company as VORANOL™ CP 450).

Starter Compound 3 A polyoxypropylene diol having a number average molecular weight of approximately 400 g/mol (available from The Dow Chemical Company as VORANOL™ P 400).

DMC Catalyst A zinc hexacyanocobaltate catalyst complex (available from Bayer Material Scince, Inc. under the name Arcol 3® Catalyst).

FAB Tris(pentafluorophenyl)borane (available from Boulder Scientific).

Additive An acidifying agent that includes phosphoric acid.

Working Examples 1 to 6 and Comparative Examples A to E are prepared using the above materials according to the conditions outlined in Table 1, below. Referring to Table 1, the number average molecular weight is as determined by gel permeation chromatography, as discussed above. The primary hydroxyl group content (i.e., Primary OH) determined by derivatization using trifluoroacetic anhydride followed by $^{19}$F-NMR), as discussed above.

TABLE 1

| | Initiator | Oxirane | DMC (ppm) | First Temp (° C.) | FAB (ppm) | Second Temp (° C.) | Mn (observed) | Primary OH (%) |
|---|---|---|---|---|---|---|---|---|
| Triol - Change in Temperature | | | | | | | | |
| Ex. 1 | PO Triol | PO | 75 | 130 | 250 | 110 | 5300 | 69 |
| Ex. 2 | PO Triol | PO | 75 | 130 | 250 | 60 | 4500 | 68 |
| Ex. A | PO Triol | PO | 75 | 130 | — | — | 4700 | 9 |
| Ex. B | PO Triol | PO | 75 | 130 | 250 | 140 | 4400 | 15 |
| Ex. C | PO Triol | PO | 75 | 130 | 250 | 130 | 3600 | 26 |
| Triol - Mixed Feed | | | | | | | | |
| Ex. 3 | PO Triol | PO/EO | 140 | 130 | 250 | 90 | 5300 | 70 |
| Ex. D | PO Triol | PO/EO | 140 | 130 | — | — | 4100 | 42 |
| Triol - Reduction in Amount of Catalyst | | | | | | | | |
| Ex. 4 | PO Triol | PO | 40 | 140 | 150 | 90 | 5300 | 69 |
| Diol - Change in Temperature | | | | | | | | |
| Ex. 5 | PO Diol | PO | 75 | 130 | 250 | 90 | 3000 | 70 |
| Diol - Mixed Feed | | | | | | | | |
| Ex. 6 | PO Diol | PO/BO | 75 | 140 | 258 | 90 | 2600 | 61 |
| Ex. E | PO Diol | PO/BO | 75 | 140 | — | — | 2100 | 5 |

Working Example 1 is a polyoxypropylene triol prepared using the Starter Compound 1 (i.e., a propoxylated triol having a molecular weight of approximately 700 g/mole) and the sequential dual catalyst process, in which the second temperature for the addition of FAB is 20 degrees less than the first temperature for the addition of the DMC. In particular, Working Example 1 is prepared using the following method: a 500 mL pressure reactor is charged with the Starter Compound 1 (50 g), the Additive (1.3 μL of a 0.15 M solution), and the DMC Catalyst (0.024 g). The mixture is dried by heating to 130° C. for 2 hours under a nitrogen sparge. Upon blocking nitrogen flow and closing the vent, propylene oxide is slowly added to the reactor as a PO feed. The DMC Catalyst is activated in approximately 20-30 minutes, during which the PO feed is gradually increased to 2.0-2.5 mL/min. Upon addition of approximately 240 mL of PO using the PO feed, the feed is blocked and the reaction is allowed to continue for 15 min and cooled to 60° C. Thereafter, the FAB (0.080 g) is added as one portion and the reactor is heated to 110° C. The PO feed is resumed at a rate of approximately 0.3-0.6 mL/min. Upon addition of approximately 91 mL of PO, the reaction is allowed to digest for 30 minutes, and purged with nitrogen for 45 minutes.

For example, with respect to Working Example 1 the following reaction may be carried out:

C. for 2 hours under a nitrogen sparge. Upon blocking nitrogen flow and closing the vent, propylene oxide was slowly added to the reactor as PO feed until the pressure reached 20 psi. Then, the PO feed is turned off and the reaction is allowed to continue until over a period of 11 minutes and the pressure reaches 8.9 psi. The catalyst is considered "activated" at this time and the PO feed is resumed and gradually increased to 2.0-2.5 mL/min. Upon addition of approximately 330 mL of PO using the PO feed, the feed is blocked and the reaction is allowed to continue for 30 minutes and purged with nitrogen for an additional 30 minutes at 130° C. Then, the reactor is cooled to 70° C. and

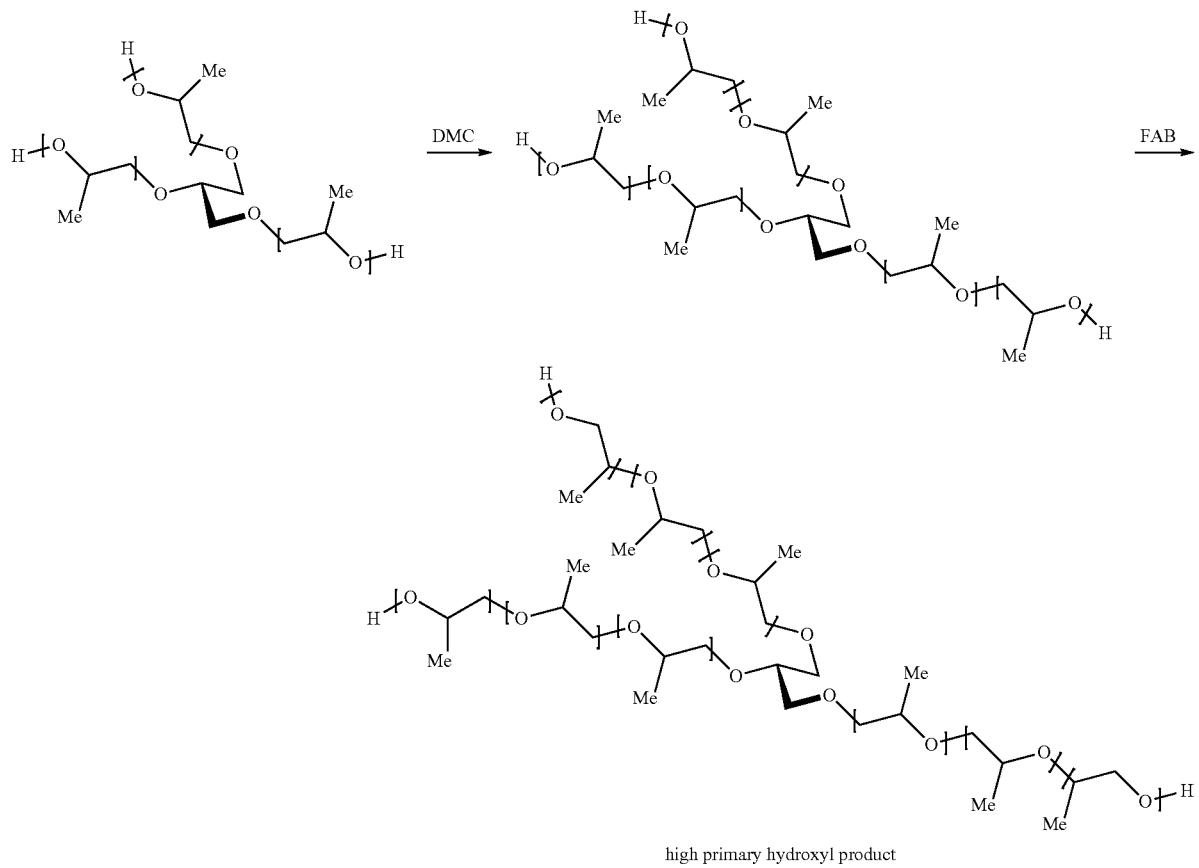

high primary hydroxyl product

Working Example 2 is a polyoxypropylene triol prepared using the Starter Compound 1 and the sequential dual catalyst process, in which the second temperature for the addition of FAB is 70 degrees less than the first temperature for the addition of the DMC. In particular, Working Example 2 is prepared using the same method as discussed above with respect to Working Example 1, except after the FAB is added the reactor is maintained at 60° C.

Comparative Example A is a polyoxypropylene triol prepared using the Starter Compound 1 and the sequential dual catalyst process, but the second temperature for the addition of FAB is higher than the first temperature for the addition of the DMC. In particular, Comparative Example B is prepared using the following method: a 500 mL pressure reactor is charged with the Starter Compound 1 (50 g), the Additive (1.3 μL of a 0.15 M solution), and the DMC Catalyst (0.024 g). The mixture is dried by heating to 130° the FAB (0.080 g) is added as one portion and the reactor is stirred for 30 minutes to homogenize the catalyst.

Comparative Example B is a polyoxypropylene triol prepared using the Starter Compound 1 and the sequential dual catalyst process, but the second temperature for the addition of FAB is 10° C. higher than the first addition (140° C.). A 500 mL pressure reactor is charged with the Starter Compound 1 (50 g), phosphoric acid (1.3 μL of a 0.15 M solution), and the DMC Catalyst (0.024 g). The mixture is dried by heating to 130° C. for 2 hours under a nitrogen sparge. Upon blocking nitrogen flow and closing the vent, propylene oxide is slowly added to the reactor. The DMC catalyst is activated in approximately 20 to 30 minutes upon which PO feed is gradually increased to 2.0-2.5 mL/min. Upon addition of 239.4 mL of PO, the feeds are blocked and the reaction is allowed to continue for 15 minutes. Then, the reactor is cooled to 60° C. and the FAB (0.080 g) is added in one portion and the reactor is heated to 140° C. Propylene oxide feed is resumed at rate of 0.3-0.6 mL/min. Upon addition of 90.8 mL of additional PO, the reaction is allowed to continue for 30 minutes and purged with nitrogen for 45 minutes.

Comparative Example C is a polyoxypropylene triol prepared using the Starter Compound 1 and the sequential dual catalyst process, but the second temperature for the addition of FAB is the same as the first temperature for the addition of the DMC. In particular, Comparative Example C is prepared using a similar method as discussed, above, with respect to Working Example 1, except after the FAB is added the reactor is set as 130° C.

Comparative Example D is a polyoxypropylene triol prepared using the Starter Compound 2 (i.e., a propoxylated triol having a molecular weight of approximately 450 g/mole) and the DMC Catalyst, the triol is prepared without using FAB and has a relatively low primary hydroxyl content. In particular, Comparative Example D is prepared using a similar method as discussed, above, with respect to Comparative Example A, except 833 grams of Starter Compound 2 is used instead of Starter Compound 1 (as well as 0.083 grams of the Additive and 225 mgs of the DMC Catalyst). Further, the reactor is heated to 140° C. and subject to a vacuum for 1 hour. A mixed oxide feed (92.6 g) consisting of propylene oxide and ethylene oxide (98/2 by weight) is added. The reaction is allowed to continue for 30 minutes at the same temperature. The mixed oxide feed (5010 g, propylene oxide/ethylene oxide 98/2 by weight) is resumed, following which a mixed feed (1565 g) consisting of 25/75 by weight of propylene oxide and ethylene oxide is added. After 30 minutes, a short vacuum stripping is performed.

Working Example 3 is prepared using Comparative Example D (i.e., a polyoxypropylene triol prepared using the Starter Compound 2), in which thereafter the FAB is added at a second temperature that is 40 degrees less than the first temperature for the addition of the DMC. The addition of the FAB is carried out using a similar method as discussed, above, with respect to Working Example 1, except the second temperature is set as 90° C. In particular, to for Working Example 4, a 1 L pressure reactor is charged with the product from Comparative Example D (approximately 373 grams) and FAB (0.113 g), using a pressurized stainless steel bomb. The reactor is heated to 90° C. under a nitrogen sparge. Upon blocking nitrogen flow and closing the vent, propylene oxide (76.9 mL) is added to the reactor at 0.6 mL/min. The reaction is allowed to continue for 30 minutes, purged with nitrogen, and sampled (1.5 g). Upon blocking nitrogen flow and closing the vent, ethylene oxide (16 g) is added at a rate of 0.35 g/min using a mass flow controller. The reaction is allowed to continue for 30 minutes and purged with nitrogen for 45 minutes.

Working Example 4 is polyoxypropylene triol prepared using the Starter Compound 1 and the sequential dual catalyst process, in which the second temperature for the addition of FAB is 50 degrees less than the first temperature for the addition of the DMC and the amounts of both the DMC catalyst and FAB catalyst used are reduced. In particular, Working Example 4 is prepared using a similar method as discussed, above, with respect to Working Example 1, except the amounts of the catalysts are reduced and the second temperature is set as 90° C. In particular, a 500 mL pressure reactor is charged with the Starter Compound 1 (50 g), the Additive (1.5 μL of a 0.15 M solution), and the DMC Catalyst (0.01 g). The mixture is dried by heating to 140° C. for 2 hours under a nitrogen sparge. Upon blocking nitrogen flow and closing the vent, propylene oxide is added to the reactor at 0.6 mL/min as a PO feed. The PO feed is gradually increased to 2.5 mL/min and the pressure in the reactor is below 12 psig over the course of addition of 239.2 mL of PO. Then, the feeds are blocked and the reaction is allowed to continue for 15 minutes and cooled to 90° C. under a purge of nitrogen. Then, FAB (0.048 g) is added in one portion and the PO feed is resumed at rate of 0.5 mL/min. Upon addition of 84.7 mL of propylene oxide, the reaction is allowed to continue for 30 minutes, purged with nitrogen for 30 minutes, and cooled.

Working Example 5 is a polyoxypropylene diol prepared using the Starter Compound 3 (i.e., a propoxylated diol having a molecular weight of approximately 400 g/mole) and the sequential dual catalyst process, in which the second temperature for the addition of FAB is 40 degrees less than the first temperature for the addition of the DMC. In particular, Working Example 5 is prepared using a similar method as discussed, above, with respect to Working Example 1, except Starter Compound 3 is used instead of Starter Compound 1 and the second temperature is set as 90° C. In particular, a 500 mL pressure reactor is charged with the Starter Compound 3 (65 g), the Additive (2.3 μL of a 0.15 M solution), and the DMC Catalyst (0.028 g). The mixture is dried by heating to 130° C. for 2 hours under a nitrogen sparge. Upon blocking nitrogen flow and closing the vent, propylene oxide is slowly added to the reactor as the PO feed. The PO feed is gradually increased to 1.5-2.0 mL/min over 40 minutes and the pressure in the reactor is less than 15 psig over the course of addition of 236.3 mL of PO. The, the feeds are blocked and the reaction is allowed to continue for 10 minutes. Nitrogen is added to the reactor and the contents are allowed to cool. Then, FAB (0.095 g) is added in one portion and the reactor is heated to 90° C. under a nitrogen purge. PO feed is resumed at 90° C., at a rate of 0.5 mL/min. Upon addition of 157.5 mL of PO, the reaction is allowed to continue for 33 minutes at 90° C. and purged with nitrogen for 40 minutes at 90° C.

Comparative Example E is a polyoxypropylene diol prepared using the Starter Compound 3 and the DMC Catalyst, the diol is prepared without using FAB and has a relatively low primary hydroxyl content. In particular, Comparative Example E is prepared using a similar method as discussed, above, with respect to Comparative Example A, except Starter Compound 3 is used instead of Starter Compound 1 and the first temperature is set to 140° C. In particular, a 1 L pressure reactor is charged with the Starter Compound 3 (125 g), the Additive (1.85 μL of a 0.15 M solution), and the DMC Catalyst (0.03 g). The mixture is dried by heating to 140° C. for 2 hours under a nitrogen sparge. Upon blocking nitrogen flow and closing the vent, propylene oxide is added to the reactor at 1.0 mL/min as the PO feed. The PO feed is gradually increased to 3.5 mL/min and the pressure in the reactor is below 9 psig over the course of addition of 132.2 mL of PO. Then, the feeds are blocked and the reaction is allowed to continue for 8 minutes. Next, butylene oxide (BO) is added to the reactor at feed rate of 0.6 mL/min, which is increased to 3.5 mL/min over 35 minutes. The pressure in the reactor is below 17 psig over the course 408.7 mL of BO. Then, the feeds are blocked and the reaction is allowed to digest for 15 minutes and cooled to 70° C.

Working Example 6 is prepared using Comparative Example E (i.e., a polyoxypropylene diol prepared using the Starter Compound 3), in which thereafter the FAB is added at a second temperature that is 50 degrees less than the first temperature for the addition of the DMC. The addition of the FAB is carried out using a similar method as discussed, above, with respect to Working Example 1, except the second temperature is set as 90° C. In particular, FAB (0.108 g) is added in one portion to the a sample of Comparative Example E. The round bottom flask is transferred to a rotary evaporator and heated to 110° C. for 20 minutes under a vacuum of 85 mbar and a nitrogen purge. The contents of the flask are brought to 1 atmosphere using nitrogen and transferred into the pressure reactor via a funnel while the contents were hot. The pressure reactor is heated to 90° C. under a nitrogen purge, then the purge is stopped and the vent is closed. Next, BO feed is resumed at rate of 0.5 mL/min. Upon addition of 202.7 mL of BO, the reaction is allowed to digest for 30 minutes, purged with nitrogen for 45 minutes, and cooled.

The invention claimed is:

1. A method of producing a high primary hydroxyl group content and a high number average molecular weight polyol, comprising:
preparing a mixture that includes a first catalyst and a low molecular weight polyether polyol having a number average molecular weight of less than 1,000 g/mol, the polyether polyol being derived from propylene oxide, ethylene oxide, or butylene oxide, and the first catalyst being a double metal cyanide catalyst;
setting the mixture to having a first temperature, adding at least one selected from propylene oxide, ethylene oxide, and butylene oxide to the mixture at the first temperature, and allowing the mixture to react to form a reacted mixture;
adding a second catalyst to the reacted mixture, the second being a Lewis acid catalyst having the general formula $M(R^1)_1(R^2)_1(R^3)_1(R^4)_{0 \text{ or } 1}$, whereas M is boron, aluminum, indium, bismuth or erbium, $R^1$ and $R^2$ each independently includes a fluoro-substituted phenyl or methyl group, $R^3$ includes a fluoro-substituted phenyl or methyl group or a functional group or functional polymer group, optional $R^4$ is a functional group or functional polymer group; and
setting the reaction mixture including the second catalyst to have a second temperature that is less than the first temperature and adding additional at least one selected from propylene oxide, ethylene oxide, and butylene oxide to the reacted mixture at the second temperature such that a resultant polyol having a primary hydroxyl group content of at least 60% and a number average molecular weight greater than 2,500 g/mol is formed.

2. The method as claimed in claim 1, wherein the second catalyst is a Lewis acid catalyst having the general formula $M(R^1)_1(R^2)_1(R^3)_1(R^4)_{0 \text{ or } 1}$, whereas M is boron, and R1 and R2 are each independently the fluoro-substituted phenyl group.

3. The method as claimed in claim 2, wherein the second catalyst is tris(pentafluorophenyl)borane or a pentafluorophenylborane based catalyst complex with the functional group or functional polymer group.

4. The method as claimed in claim 1, wherein the second catalyst is a metal triflate, whereas M is aluminum, indium, bismuth or erbium, and $R^1$, $R^2$, and $R^3$ are each a $CF_3SO_3$ group that includes a fluoro-substituted methyl group.

5. The method as claimed in claim 1, wherein the first catalyst is added before any of the second catalyst is added such that the first and second catalysts are added separately.

6. The method as claimed in claim 1, wherein:
all of the first catalyst is added before any of the second catalyst is added such that the first and second catalysts are added separately, and
the temperature of the reacted mixture is changed from the first temperature to the second temperature after all of the first catalyst is added.

7. The method as claimed in claim 1, wherein a polyol treatment step is not performed after preparing the mixture that includes the first catalyst and the low molecular weight polyether polyol and before forming the polyol having the primary hydroxyl group content of at least 60% and the number average molecular weight greater than 2,500 g/mol.

8. The method as claimed in claim 1, wherein a filtration step is not performed after preparing the mixture that includes the first catalyst and the low molecular weight polyether polyol and before forming the polyol having the primary hydroxyl group content of at least 60% and the number average molecular weight greater than 2,500 g/mol.

9. The method as claimed in claim 1, wherein the difference between the first temperature and the second temperature is at least 20° C.

10. The method as claimed in claim 1, wherein the first temperature is in a range from 125° C. to 160° C. and the second temperature is in a range from 60° C. to 115° C.

11. The method as claimed in claim 1, wherein the polyether polyol is derived from propylene oxide, at the first temperature propylene oxide is added to the mixture, and at the second temperature at least one selected from propylene oxide, ethylene oxide, and butylene oxide is added to the reaction mixture.

12. The method as claimed in claim 1, wherein the polyether polyol is derived from butylene oxide, at the first temperature butylene oxide is added to the mixture, and at the second temperature at least one of propylene oxide, ethylene oxide, and butylene oxide is added to the reaction mixture.

13. The method as claimed in claim 1, wherein the polyether polyol is derived from ethylene oxide, at the first temperature ethylene oxide is added to the mixture, and at the second temperature at least one of propylene oxide, ethylene oxide, and butylene oxide is added to the reaction mixture.

14. The method as claimed in claim 1, wherein the method is a one pot process for synthesizing the polyol having the primary hydroxyl group content of at least 60% and the number average molecular weight greater than 2,500 g/mol is formed.

* * * * *